US012789181B2

(12) United States Patent
Wang et al.

(10) Patent No.: US 12,789,181 B2
(45) Date of Patent: Nov. 10, 2026

(54) TLC EXTRACTION DEVICE, COMBINED SYSTEM AND EXTRACTION METHOD

(71) Applicant: SHIMADZU CORPORATION, Kyoto (JP)

(72) Inventors: Yiming Wang, Shanghai (CN); Wenjian Sun, Shanghai (CN)

(73) Assignee: SHIMADZU CORPORATION, Nishinokyo (JP)

( * ) Notice: Subject to any disclaimer, the term of this patent is extended or adjusted under 35 U.S.C. 154(b) by 430 days.

(21) Appl. No.: 18/628,928

(22) Filed: Apr. 8, 2024

(65) Prior Publication Data

US 2024/0351022 A1 Oct. 24, 2024

(30) Foreign Application Priority Data

Apr. 20, 2023 (CN) ......................... 202310427854.7

(51) Int. Cl.

| | |
|---|---|
| ***B01L 3/00*** | (2006.01) |
| ***G01N 1/28*** | (2006.01) |
| ***G01N 1/40*** | (2006.01) |
| ***G01N 30/95*** | (2006.01) |

(52) U.S. Cl.

CPC ............ *B01L 3/5023* (2013.01); *G01N 1/286* (2013.01); *G01N 30/95* (2013.01); *B01L 2300/0681* (2013.01); *B01L 2300/069* (2013.01); *B01L 2400/0406* (2013.01); *B01L 2400/0487* (2013.01); *B01L 2400/084* (2013.01); *G01N 2001/2873* (2013.01); *G01N 2001/4088* (2013.01)

(58) Field of Classification Search

CPC ....... B01L 2300/0681; B01L 2300/069; B01L 2400/0406; B01L 2400/0487; B01L 2400/084; B01L 3/5023; G01N 1/286; G01N 1/405; G01N 2001/2873; G01N 2001/4061; G01N 2001/4088; G01N 2291/0258; G01N 2291/044; G01N 29/069; G01N 29/07; G01N 30/16; G01N 30/72; G01N 30/90; G01N 30/95

See application file for complete search history.

(56) References Cited

U.S. PATENT DOCUMENTS

| | | | | |
|---|---|---|---|---|
| 2015/0176066 A1* | 6/2015 | Okumura | ............. | C12Q 1/6813 422/424 |
| 2016/0203965 A1 | 7/2016 | Rorick et al. | | |
| 2024/0003858 A1* | 1/2024 | Van Dam | .............. | C07B 59/001 |

FOREIGN PATENT DOCUMENTS

| | | |
|---|---|---|
| CN | 107430048 A | 12/2017 |

* cited by examiner

*Primary Examiner* — Jennifer Wecker
*Assistant Examiner* — Jonathan Bortoli
(74) *Attorney, Agent, or Firm* — Muir Patent Law, PLLC

(57) ABSTRACT

The present disclosure provides a TLC extraction device that uses a simpler device structure and can quickly collect, prepare and analyze samples. An aspect of the present disclosure provides a TLC extraction device including: a sampler having a solvent inlet and a solvent outlet, the solvent outlet having a sharp edge for cutting down a fixed size of adsorbent from an adsorbent layer of TLC plate, the adsorbent being kept between the solvent inlet and the solvent outlet; a solvent injector in communication with the solvent inlet; and a filter that is detachably installed to the solvent outlet.

11 Claims, 4 Drawing Sheets

TLC EXTRACTION DEVICE, COMBINED SYSTEM AND EXTRACTION METHOD

TECHNICAL FIELD

The present disclosure relates to the technical field of solution analysis, in particular to a TLC extraction device, a TLC-MS combined system and a TLC extraction method.

BACKGROUND ART

Thin layer chromatography (TLC) is a chromatographic technique for separating mixtures. Generally, TLC is firstly used to separate the mixture, then the separated compound is scraped off manually so as to do solvent extraction, filtration and purification to extract the separated analyte from the adsorbent. Finally, the separated analyte is introduced into a detection device such as a mass spectrometer for further detection. In this way, the separation and detection of organic compounds are achieved, however, the operational process is complicated.

Patent Literature 1 discloses a surface extraction interface that can perform real-time extraction and on-line measurement on the material composition of object surface. Specifically, the surface extraction interface seals the extracted area from the other areas by a sealing assembly abutting against or cutting into the surface of an adsorbent, and then continuously introduces an extraction solvent into the area from a solvent inlet. The extracted solvent then flows out from a solvent outlet on the same side nearby and enters a mass spectrometer for detection, thereby extracting and detecting the analyte on the surface of the area in real time. However, on one hand, the structure of the system is complicated, and the extraction time for one spot is relatively long. On the other hand, such continuous extraction method can easily cause the break of adsorbent on of the TLC plate, which may result in the clogging of the pipeline or frequent replacement of the internal filter material.

Therefore, an improved technical solution is required to solve the above problems of existing TLC extraction methods.

SUMMARY OF THE INVENTION

In view of the above problems in the prior art, the technical solution of the present disclosure provides a TLC extraction device that uses a simpler device structure and can quickly collect, prepare and analyze samples.

A first aspect of the present disclosure provides a TLC extraction device including: a sampler having a solvent inlet and a solvent outlet, the solvent outlet having a sharp edge for cutting down a fixed size of adsorbent from TLC plate, the adsorbent being kept between the solvent inlet and the solvent outlet; a solvent injector in communication with the solvent inlet; and a filter that is detachably installed to the solvent outlet.

According to the technical solution, for an adsorbent layer obtained after TLC separation, the user presses the sampler of the TLC extraction device provided by the present disclosure against an area whose composition is to be further detected. The sharp edge is pressed against and cut into the adsorbent layer of the TLC plate. At this time, the user can pick up the sampler to obtain a cut adsorbent in the fixed size. Then, the user injects a solvent into the solvent inlet of the sampler by using the solvent injector. The solvent extracts the analyte in the adsorbent in the through cavity of the sampler in a manner of penetrating through the adsorbent. The extracted solvent carrying the analyte flows out from the solvent outlet of the sampler, filters out the large-particle impurities (mainly the fragment of adsorbent) and can be directly injected into the subsequent detection device for analysis. The TLC extraction device is high in extraction efficiency, simple in device structure and convenient to operate, and is more suitable for sampling and detection of a specific area on TLC after separation.

As an exemplary technical solution, the filter is a syringe filter.

According to the technical solution, the syringe filter refers to a tubular structure similar to the front end of a syringe, provided with a wide-aperture filter cavity and a narrow-aperture syringe outlet. Fluid flows into the wide aperture to be filtered by a filtering structure (such as a filter membrane, a screen, fine holes and the like) located at the wide aperture, and then converges and flows out through the narrow aperture. Particularly, a disposable syringe filter can be adopted without the need of replacing the filter materials, so that the possibility of pipeline clogging is reduced, and the risk of cross-contamination between samples can be reduced.

As an exemplary technical solution, the filter is a syringe needle connected to the solvent outlet, and the inner diameter of the syringe needle is 0.05-0.5 mm.

According to the technical solution, the syringe needle refers to a slender needle tube structure installed at the front end of a syringe. The large-particle substrate cannot pass through the syringe needle with the inner diameter of 0.05-0.5 mm, so that the extracted solvent can directly pass through the syringe needle to complete the filtering and simultaneously converges into a small stream, without the need of arranging a filter cavity or a filtering material. Further, the absence of wide-aperture cavity can avoid the sample dilution caused by excessive solvent in a wide-aperture cavity.

As an exemplary technical solution, the TLC extraction device is used as a sampling device for a mass spectrometer, and the solvent outlet is in communication with the sampling orifice of the mass spectrometer.

According to the technical solution, the TLC is combined with a mass spectrometer, so that the substance composition of a complicated mixture can be analyzed and detected more conveniently. The TLC can separate the components of the mixture, and different separated substances are located in different areas in the adsorbent layer of the TLC. The adsorbent carrying the analyte in the predetermined area is obtained by pressing and cutting of the sampler of the TLC extraction device according to the present disclosure. The solvent flows out of the solvent outlet after completing the extraction through the ad sorbent, and directly flows into the mass spectrometer after filtering for substance component detection. Thereby, separation and detection of the complicated mixture can be completed conveniently. Particularly, the TLC extraction device can be combined with a mass spectrometer equipped with a direct analysis ion source, so that the substance analysis efficiency can be further improved.

As an exemplary technical solution, the solvent injector is a syringe, outlet of which is detachably connected to the solvent inlet of the sampler.

According to the technical solution, the syringe refers to a syringe structure provided with a piston and a syringe outlet but not provided with a syringe needle. The small-aperture outlet at the front end of the syringe facilitates the installation, and the structure of the syringe is simple and easy to obtain, which facilitates large-scale production. In addition, the solvent injector, the sampler and the filter are detachable structures, and are portable and suitable for various detection scenes.

As an exemplary technical solution, the solvent injector is a liquid pump.

According to the technical solution, the liquid pump as the solvent injector can automatically push in the solvent according to the settings without manual operation, and can accurately control the pushing amount of the extraction solvent.

As an exemplary technical solution, the sharp edge is annular, and the inner diameter of the sharp edge is 0.1-10 mm.

According to the technical solution, the annular edge with the inner diameter of 0.1-10 mm can press against and cut into the adsorbent layer and then hoop the detached adsorbent with the inner wall of the annular edge. After the filter being installed, the extraction can be performed by directly injecting the extraction solvent into the sampler.

As an exemplary technical solution, the sampler further comprises a flow restrictor located between the solvent outlet and the solvent inlet.

According to the technical solution, the flow restrictor only allows one-way flow of fluid from the solvent inlet to the solvent outlet, thereby preventing backflow from the solvent outlet to the solvent inlet. Further, the sharp edge is located away from the solvent inlet, so that the impurity particles in the sampler are prevented from flowing from the solvent inlet into the solvent injector.

A second aspect of the present disclosure provides a TLC-MS combined system including the TLC extraction device according to the technical solution described above.

A third aspect of the present disclosure provides a TLC extraction method including:

- a sampling step for pressing a sharp edge of a sampler against an adsorbent layer of TLC plate and then lifting up, thereby cutting down a fixed size of adsorbent;
- an extraction step for injecting solvent into the sampler to extract analytes from the adsorbent; and
- a filtration step for filtering the solvent with extracted analytes obtained by the extraction step.

As an exemplary technical solution, the TLC extraction method further includes: a detection step for transferring the solvent filtered during the filtration step to a mass spectrometer for detection.

DESCRIPTIONS OF THE DRAWINGS

DETAILED DESCRIPTION

Some embodiments of the present disclosure are described below with reference to the accompanying drawings. Those skilled in the art should understand that these embodiments are merely used to explain the technical principles of the present disclosure, and are not intended to limit the protection scope of the present disclosure.

First Embodiment

Figure 1:
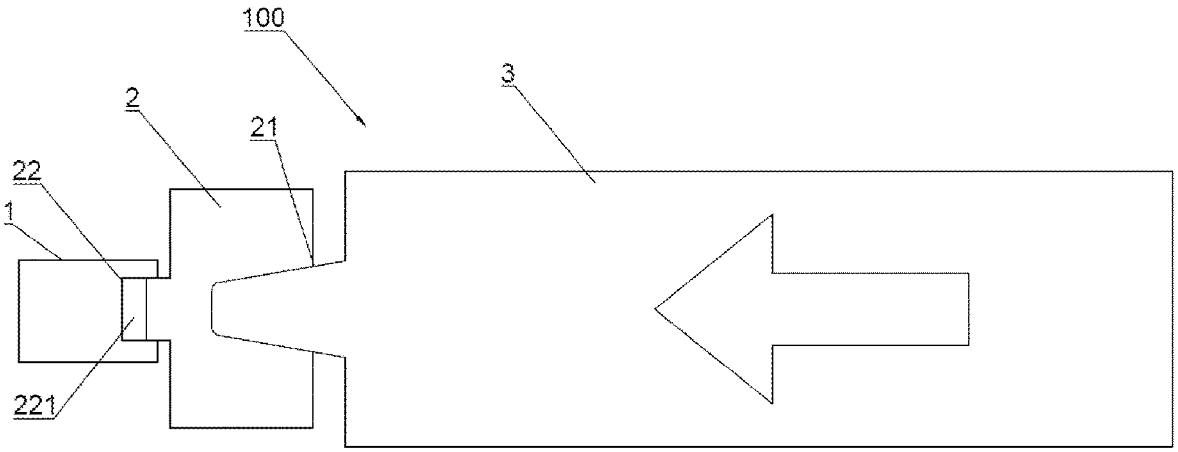
FIG. 1 is a schematic structural diagram of a TLC extraction device according to a first embodiment of the present disclosure.

FIG. 1 is a schematic structural diagram of a TLC extraction device according to an embodiment of the present disclosure. The TLC extraction device 100 includes a sampler 2, a solvent injector 3, and a filter 1.

The sampler 2 forms a through cavity structure. The opposite sides of the cavity structure are provided with two through openings, a solvent inlet 21 at one end and a solvent outlet 22 at the other end. In particular, the inner wall of the cavity body at the solvent outlet end of the sampler 2 is formed into a sharp edge 221 for cutting down a fixed size of adsorbent from the adsorbent layer of the TLC. Note that the sharp edge 221 herein refers to a sharp edge formed by extending the inner wall of the solvent outlet 22 in a manner thinning outward, rather than a tip structure formed by inner wall wrapping inward.

In the present embodiment, the shape of the sharp edge 221 of the solvent outlet 22 is not limited herein, and the user can set the sharp edge 221 as a cutting structure of any size and shape according to the sampling size and shape of the adsorbent. Preferably, the sharp edge 221 is annular and has an inner diameter of 0.1-10 mm. Note that the sharp edge 221 with an annular edge with an inner diameter of 0.1-10 mm can press against and cut into the adsorbent layer and then hoop the edge of detached adsorbent around the inner wall of the annular edge. Thereafter, the extraction can be performed by directly installing the solvent injector 3 and the filter 1 respectively on both sides of the sampler 2 and injecting the extraction solvent into the sampler 2.

The solvent injector 3 is located at the solvent inlet end of the sampler 2 and is used for injecting a certain amount of extraction solvent into the sampler 2. The solvent injector 3 can be any liquid extractor/injector, such as a piston reciprocating pump, a liquid pump, a peristaltic pump, a syringe and the like. In some exemplary embodiments, the solvent injector 3 is a syringe (not illustrated in FIG. 1). The syringe in this embodiment is a syringe structure without a syringe needle. The syringe structure has a piston and a syringe outlet. The syringe outlet is generally a small-aperture pipe, which is convenient to detachably connect with the solvent inlet 21 of the sampler 2, and the syringe structure is simple and easy to obtain, which facilitates large-scale production. In addition, the solvent injector 3, the sampler 2 and the filter 1 are detachable structures, and are portable and suitable for various detection scenes. In other exemplary embodiments, the solvent injector 3 is a liquid pump. The liquid pump as the solvent injector 3 can automatically push in the solvent according to the settings without manual operation, and can accurately control the pushing amount of the extraction solvent.

The solvent injector 3 can directly communicate with a solvent storage device, and the solvent extracted from the solvent storage device is directly injected into the sampler 2, thereby refilling of the solvent is omitted, and it is suitable for the use in a fixed scene (such as laboratory). Alternatively, the solvent injector 3 can be a portable mechanism filled with solvent for one or several uses, which is suitable for various mobile detection scenes.

The filter 1 is detachably installed at the solvent outlet end of the sampler 2. The filter 1 may be any filter device having a filter membrane, fine holes, or screen structure for filtering large-particle substrate. For example, in some embodiments, the filter 1 may be a filter material matched with the shape of the solvent outlet 22 of the sampler 2, and may be directly installed at the solvent outlet 22 of the sampler 2 to filter the solvent flowing out of the sampler 2. In other embodiments, the filter 1 may be a filter cavity structure provided separately. The solvent flowing out of the solvent outlet 22 of the sampler 2 enters the filter cavity of the filter 1, and is filtered by the filter device in the cavity and then flows out of the outlet of the cavity. Preferably, the filter 1 has the inlet end matched with the aperture of the solvent outlet 22 of the sampler 2 and the other end formed as a relatively small-aperture converge port, so that the extracted solvent can be conveniently filtered and converged to form a small stream, which is convenient for injection into the subsequent detection device.

Figure 2:
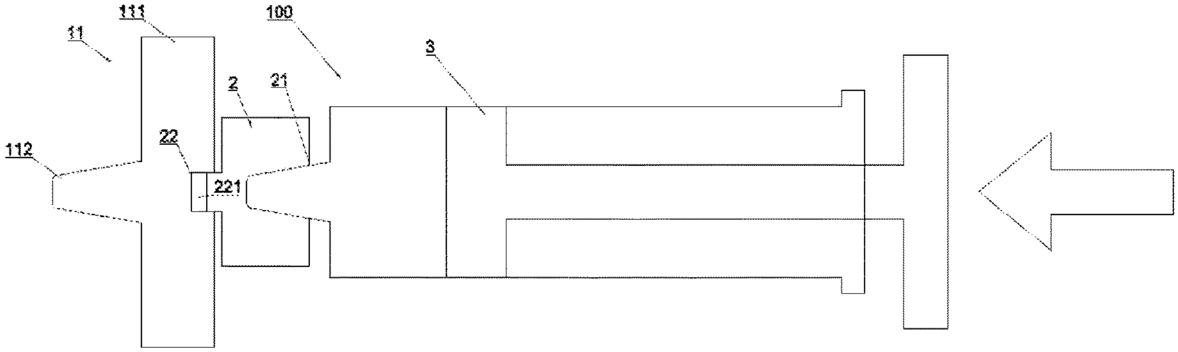
FIG. 2 is a schematic structural diagram of an exemplary filter in the TLC extraction device according to the first embodiment of the present disclosure.

FIG. 2 is a schematic structural diagram of an exemplary filter in a TLC extraction device according to an embodiment of the present disclosure.

As illustrated in FIG. 2, the filter 1 is a syringe filter 11. The syringe filter 11 refers to a tubular structure similar to the front end of a syringe, provided with a wide-aperture filter cavity 111 and a narrow-aperture syringe outlet 112. This enables the extracted solvent to be reduced in flow rate in the wide-aperture filter cavity 111, filtered by a filter structure (for example, a filter membrane, a screen, fine holes, etc.) located in the filter cavity 111, and then converge and flow out through the narrow aperture. Particularly, a disposable syringe filter 11 can be adopted without the need of replacing the filter materials, so that the possibility of pipeline clogging is low, and the risk of cross-contamination between samples can be reduced.

Figure 3:
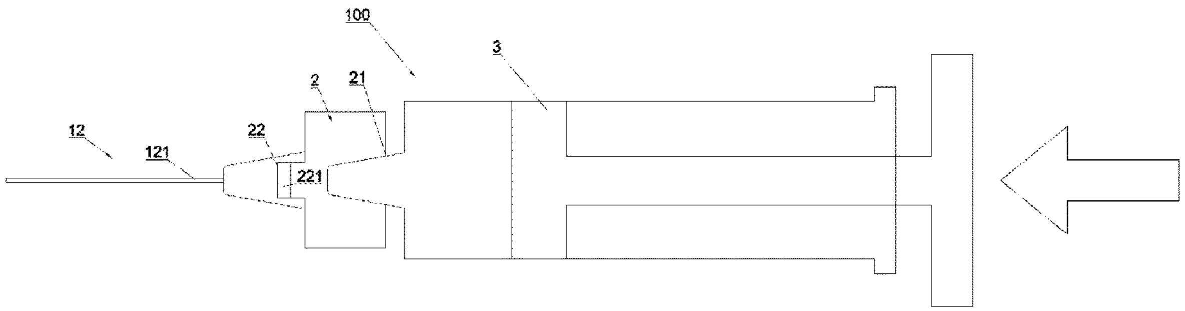
FIG. 3 is a schematic structural diagram of another exemplary filter in the TLC extraction device according to the first embodiment of the present disclosure.

FIG. 3 is a schematic structural diagram of another exemplary filter in a TLC extraction device according to an embodiment of the present disclosure.

As illustrated in FIG. 3, the filter 1 is a syringe needle 12 connected to the solvent outlet 22, and the inner diameter of the syringe needle 12 is 0.05-0.5 mm. The syringe needle 12 refers to a structure of a slender needle tube 121 installed at the front end of the syringe. The syringe needle 12 has one end sleeved on the solvent outlet 22 of the sampler 2 and the other end formed as the slender needle tube 121. The inner diameter here refers to the inner diameter of the slender needle tube 121. The large-particle substrate cannot pass through the syringe needle 12 with the inner diameter of 0.05-0.5 mm, so that the extracted solvent can directly pass through the syringe needle 12 to complete the filtering and simultaneously converges into a small stream, without the need of arranging a filter cavity 111 or a filter material. It can also avoid the dilution of sample caused by excessive solvent in the filter cavity 111.

In this embodiment, for a mixture with a complicated composition, the multiple components in the mixture may be separated by TLC, and then the separated adsorbent layer of the TLC is extracted by the TLC extraction device 100 to be introduced into a subsequent detection device for substance detection. Specifically, for the separated adsorbent layer, the sampler 2 of the TLC extraction device 100 presses against and cuts into an area to be further detected, thereby cutting down a fixed size of adsorbent. Then, the filter 1 is installed at the solvent outlet end of the sampler 2, and the solvent is injected into the solvent inlet end of the sampler 2 through the solvent injector 3. The solvent extracts the adsorbent in a manner of penetrating through the adsorbent. The extracted solvent flows out from the solvent outlet 22 on the opposite side and enters the filter 1 to be filtered. The filtered solvent can be directly injected into the subsequent detection device to be detected.

In the TLC extraction device provided by the embodiment, the adsorbent is cut down from the TLC plate instead of on-line extraction. In this way, the solvent obtained by extraction can be directly conveyed into the subsequent detection device without providing a complicated pipeline system, which simplifies the device, enhances the operation flexibility, and is suitable for sampling and detecting a specific area of the adsorbent layer after TLC separation in daily detection. In addition, the solvent is directly extracted through the adsorbent layer of the TLC without the need of repeated extraction, and a disposable syringe filter can be adopted, which reduces the risk of pipeline clogging caused by adsorbent fragments.

Figure 4:
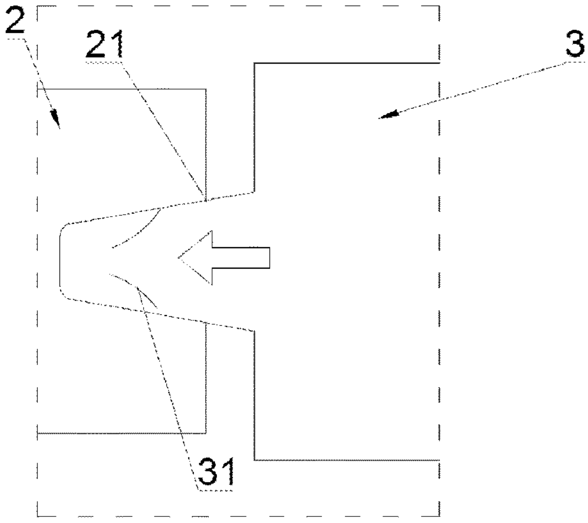
FIG. 4 is a partial enlarged view of the TLC extraction device according to the first embodiment of the present disclosure.

FIG. 4 is a partial enlarged view of the TLC extraction device according to the embodiment of the present disclosure.

As illustrated in FIG. 4, in the TLC extraction device 100, the sampler 2 further includes a flow restrictor 31 located between the solvent outlet 22 and the solvent inlet 21. The flow restrictor 31 may be a one-way valve or another mechanism capable of restricting the solvent to flow one way from the solvent inlet 21 to the solvent outlet 22 to prevent the backflow from the solvent outlet 22 to the solvent inlet 21. Further, the sharp edge 221 is located at the solvent outlet 22, so that the impurity particles (which are generally the of the adsorbent fragments) in the sampler 2 can be prevented from flowing back into the solvent injector 3 along with the solvent and contaminating the solvent.

In this embodiment, the sampler 2 of the TLC extraction device 100 can directly sample the predetermined area in the adsorbent layer after the TLC separation, and perform solvent extraction in a manner of penetrating through the adsorbent, and filter the large particles of the substrate in the extracted solvent through the structural design of the filter device, and finally complete the converge of the solvent at the outlet of the filter 1. This facilitates the subsequent injection into the detection device to further detect the analyte.

Second Embodiment

Figure 5:
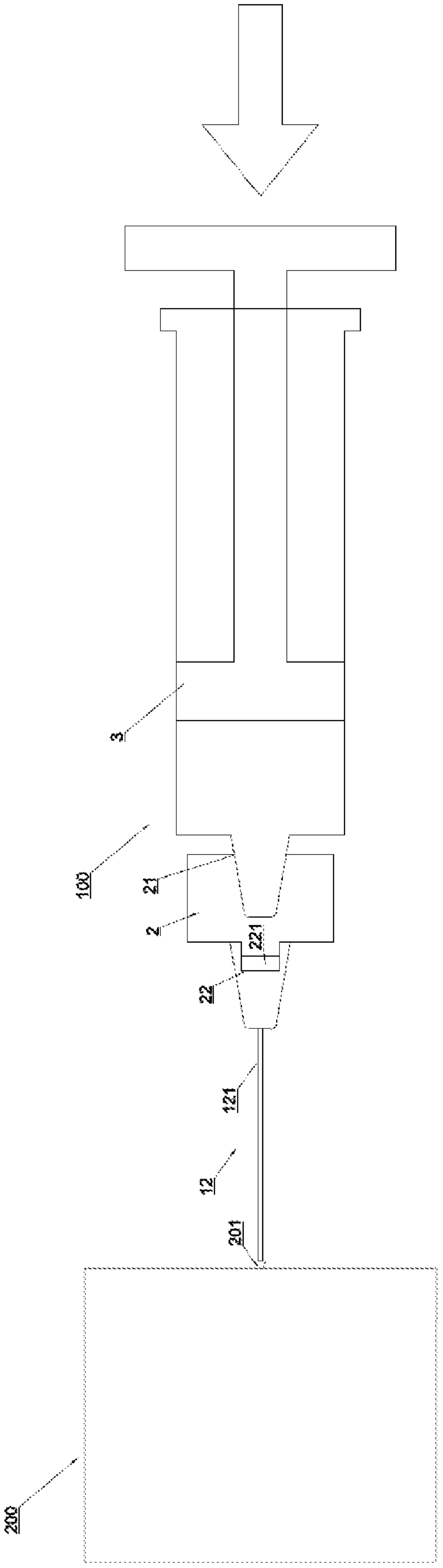
FIG. 5 is a schematic structural diagram of a TLC-MS combined system according to a second embodiment of the present disclosure.

FIG. 5 is a schematic structural diagram of a TLC-MS combined system according to a second embodiment of the present disclosure.

As illustrated in FIG. 5, the TLC-MS combined system comprises the TLC extraction device 100. The TLC extraction device 100 is used as a sampling device of a mass spectrometer 200, and the solvent outlet 22 is used for communicating with a sampling orifice 201 of the mass spectrometer 200.

Note that FIG. 5 illustrates a case where the sampling orifice of the mass spectrometer 200 communicates with the outlet of the filter 1 of the TLC extraction device 100 when the filter 1 is the syringe needle 12, but the present disclosure is not limited thereto. The TLC-MS combined system formed by communicating the mass spectrometer 200 with any one of the TLC extraction devices 100 in the first embodiment falls within the protection scope of the present disclosure.

In this embodiment, the TLC extraction device 100 combines TLC with the mass spectrometer 200, which is convenient for analyzing and detecting the composition of a complicated mixture. TLC can separate different components in the mixture, and the separated analytes are located in different areas on the adsorbent layer of the TLC. The sampler 2 of the TLC extraction device 100 of the present disclosure presses against and cuts into to obtain the adsorbent in the predetermined area. The solvent passes through the adsorbent to complete the extraction, and then flows out from the solvent outlet 22. The solvent is filtered and then directly introduced into the sampling orifice 201 of the mass spectrometer 200 to be subjected to substance component detection. Thereby, the separation and detection of the complicated mixture can be completed conveniently. Particularly, the mass spectrometer may be a mass spectrometer for direct analysis. By combining the TLC extraction device in this embodiment with a mass spectrometer equipped with a direct analysis ion source, it is possible to further improve the efficiency of substance analysis.

Third Embodiment

Figure 6:
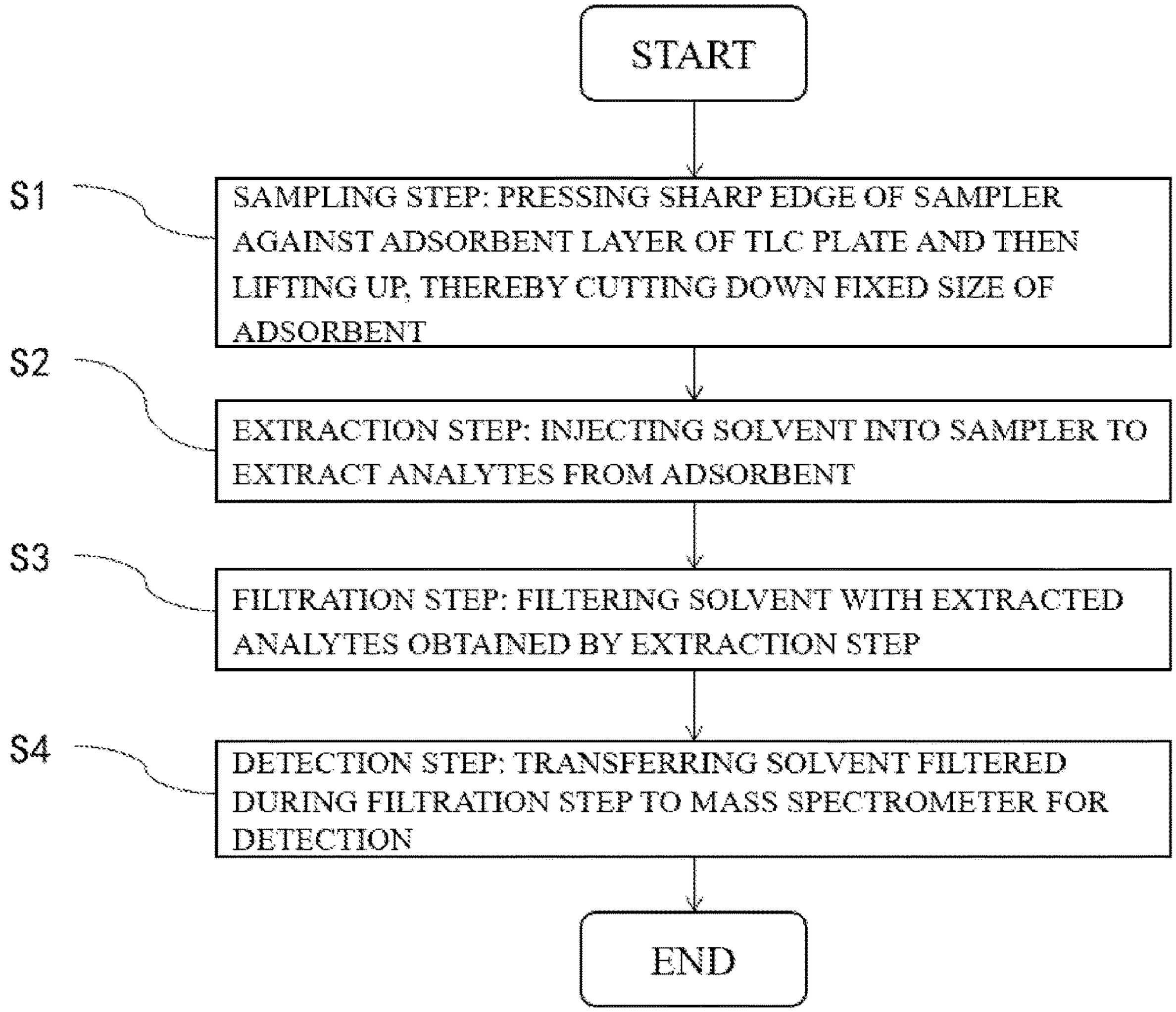
FIG. 6 is a flow chart of a TLC extraction method according to a third embodiment of the present disclosure.

FIG. 6 is a flow chart of a TLC extraction method according to a third embodiment of the present disclosure. As illustrated in FIG. 6, the TLC extraction method comprises the following steps:

- a sampling step S1 for pressing a sharp edge of a sampler against an adsorbent layer of TLC plate and then lifting up, thereby cutting down a fixed size of adsorbent;
- an extraction step S2 for injecting solvent into the sampler to extract analytes from the adsorbent; and
- a filtration step S3 for filtering the solvent with extracted analytes obtained by the extraction step.

Preferably, the TLC extraction method further includes: a detection step S4 for transferring the solvent filtered during the filtration step S3 to the mass spectrometer 200 for detection.

Specifically, referring to FIG. 1 and FIG. 6, first, the mixture is subjected to TLC detection to complete the component separation of the mixture. The separated adsorbent layer is subjected the sampling step S1 for pressing the sharp edge 221 of the sampler 2 of the TLC extraction device 100 against the area on the adsorbent layer of the TLC that needs to be further detected, thereby cutting down the fixed size of the adsorbent and keeping in the sharp edge 221 of the solvent outlet 22 of the sampler 2. Performed afterward is the extraction step S2 for installing the filter 1 at the solvent outlet end of the sampler 2, and injecting solvent is injected into the solvent inlet end of the sampler 2 through the solvent injector 3 to extract the adsorbent by the solvent penetrating through the adsorbent. The solvent carrying the analyte after extraction flows out from the solvent outlet 22 of the sampler 2, and is then subjected to the filtration step S3 of transferring the solvent carrying the analyte into the filter 1 located at the solvent outlet end of the sampler 2 for filtering. The specific method for filtering may be screen filtering, membrane filtering or small-aperture pipeline filtering. Finally, the solvent filtered during the filtration step S3 flows from the outlet of the filter 1 into the sampling orifice of the mass spectrometer 200 for detection.

The technical solutions of the present disclosure have been described above with reference to the accompanying drawings. However, those skilled in the art will easily understand that the protection scope of the present disclosure is obviously not limited to these specific embodiments. Those skilled in the art can make equivalent changes or substitutions to related technical features without departing from the principle of the present disclosure, and the technical solutions after these changes or substitutions shall fall within the protection scope of the present disclosure.

REFERENCE SIGN LIST

100 TLC extraction device
200 mass spectrometer
201 sampling orifice
1 filter
11 syringe filter
111 filter cavity
112 syringe outlet
12 syringe needle
121 slender needle tube
2 sampler
21 solvent inlet
22 solvent outlet
221 sharp edge
3 solvent injector
31 flow restrictor

What is claimed is:

1. A thin layer chromatography (TLC) extraction device comprising:

- a sampler;
- a solvent injector; and
- a filter; wherein
  - the sampler has a solvent inlet and a solvent outlet;
  - the solvent outlet has a sharp edge configured to cut a fixed size of an adsorbent from an adsorbent layer of a thin layer chromatography TLC plate with the adsorbent between the solvent inlet and the solvent outlet;
  - the solvent injector is fluidly connected to the solvent inlet; and
  - the filter is detachably attached to the solvent outlet.

2. The thin layer chromatography (TLC) extraction device according to claim 1, wherein

- the filter is a syringe filter.

3. The thin layer chromatography (TLC) extraction device according to claim 1, wherein

- the filter is a syringe needle connected to the solvent outlet, and has an inner diameter between 0.05 and 0.5 mm.

4. The thin layer chromatography (TLC) extraction device according to claim 1, wherein

- the thin layer chromatography (TLC) extraction device is configured to obtain a sample and is operable with a mass spectrometer having a sampling orifice; and
- the solvent outlet is configured to fluidly communicate with the sampling orifice.

5. The thin layer chromatography (TLC) extraction device according to claim 1, wherein the solvent injector is a syringe comprising a syringe outlet configured to detachably connect to the solvent inlet.

6. The thin layer chromatography (TLC) extraction device according to claim 1, wherein the solvent injector is a liquid pump.

7. The thin layer chromatography (TLC) extraction device according to claim 1, wherein the sharp edge is annular, and has an inner diameter between 0.1 and 10 mm.

8. The thin layer chromatography (TLC) extraction device according to claim 1, wherein the sampler further comprises a flow restrictor located between the solvent outlet and the solvent inlet.

9. A thin layer chromatography-mass spectrometry (TLC-MS) combined system comprising the thin layer chromatography TLC extraction device according to claim 1.

10. A thin layer chromatography (TLC) extraction method using the thin layer chromatography (TLC) extraction device of claim 1, the thin layer chromatography (TLC) extraction method comprising:

cutting a fixed size of the adsorbent from the adsorbent layer of the thin layer chromatography (TLC) plate with the adsorbent between the solvent inlet and the solvent outlet by pressing the sharp edge of the sampler against the adsorbent layer of thin layer chromatography (TLC) plate and then lifting the sharp edge up;

extracting a plurality of analytes from the adsorbent by injecting a solvent into the sampler; and filtering the injected solvent containing the extracted plurality of analytes.

11. The thin layer chromatography (TLC) extraction method according to claim 10, further comprising:

transferring the filtered solvent to a mass spectrometer; and detecting one or more analytes in the filtered solvent.

* * * * *